July 7, 1925.  1,545,310
F. DE URRUELA
PNEUMATIC SPRING FOR VEHICLES
Filed June 10, 1921  3 Sheets-Sheet 1
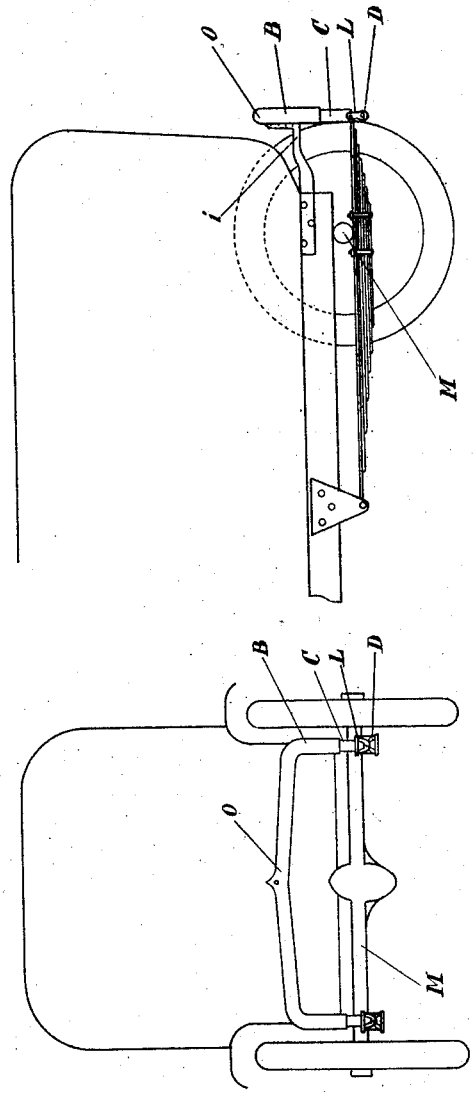
Inventor:
Francisco de Urruela
By [signature]
Attorney

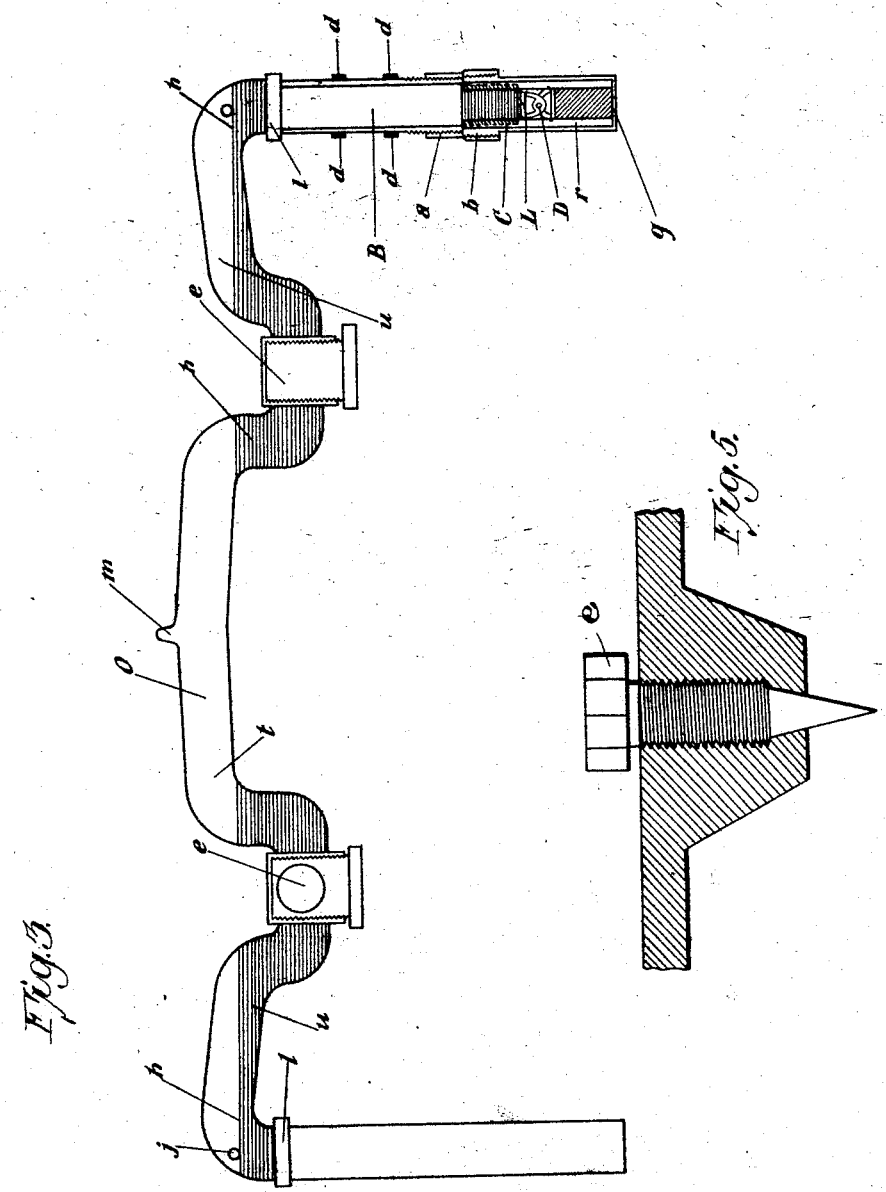

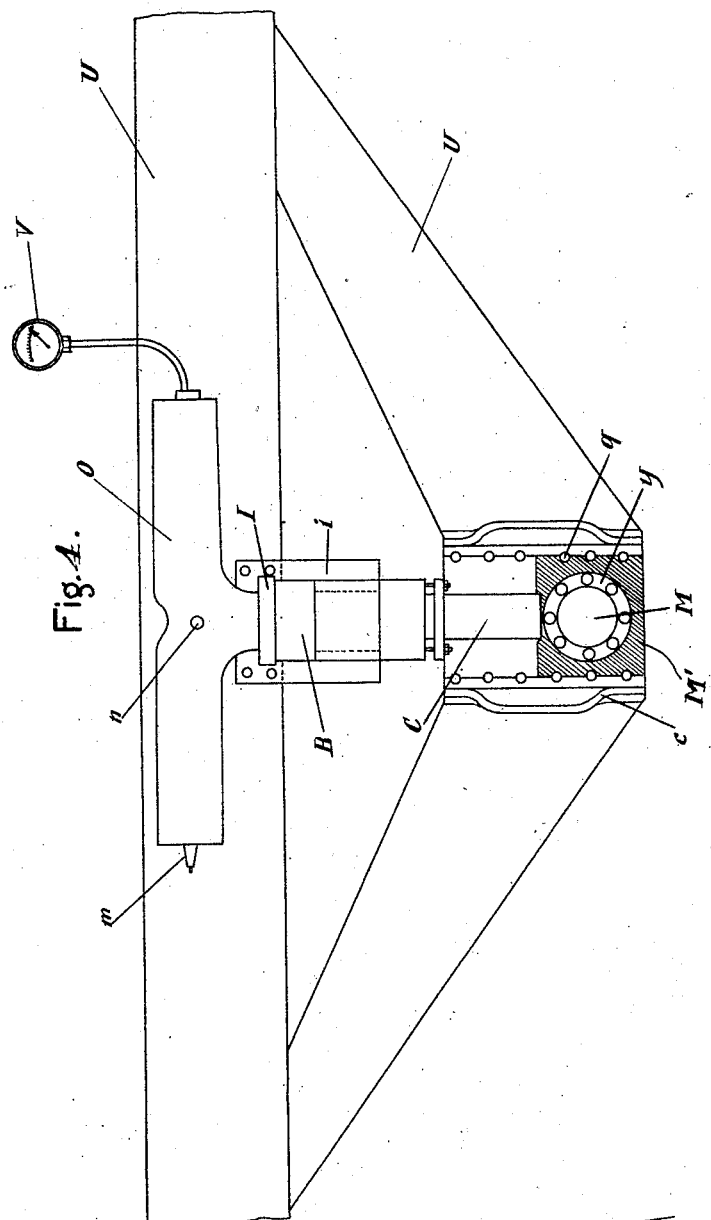

Patented July 7, 1925.

1,545,310

UNITED STATES PATENT OFFICE.

FRANCISCO DE URRUELA, OF BARCELONA, SPAIN.

PNEUMATIC SPRING FOR VEHICLES.

Application filed June 10, 1921. Serial No. 476,531.

*To all whom it may concern:*

Be it known that FRANCISCO DE URRUELA, a subject of the King of Spain, residing at Hotel Ritz, Plaza de las Cortes, Barcelona, Spain, has invented certain new and useful Improvements in Pneumatic Springs for Vehicles, of which the following is a specification.

This invention relates to improvements in pneumatic springs for use in connection with road or railway vehicles, and has for its object the provision of improved mechanism of the character, the purpose of which is to absorb the shocks transmitted from the wheels of the vehicle. The invention utilizes, as has previously been proposed, a pneumatic spring or supporting device interposed between the body of the vehicle and the chassis or frame or between the latter and the vehicle axle and comprises a cooperating piston and cylinder containing a compressible fluid, the interior of the cylinder being in free communication with a compression chamber.

According to the present invention the improved mechanism is provided for varying the capacity of the compression chamber so as to meet varying conditions of load on the vehicle, it being understood that for effective operation of the device the piston must be maintained at an intermediate point in its range of travel under all conditions of load so as to be capable of movement relative to the cylinder to absorb the shocks transmitted.

According to the present invention the compression chamber is interchangeably arranged; that is chambers of different capacities may be substituted according to the load to be supported, a sufficient quantity of fluid being introduced in the cylinder or chamber to cause the piston to occupy an intermediate position in its range of travel when the vehicle is unloaded, and the capacity of the compression chamber being selected so as to cause the piston to occupy a different but also intermediate position in its travel when the vehicle is loaded.

Any means may be employed for reducing or enlarging the capacity of the air chamber, such for instance as injecting some incompressible material in a liquid or solid state into the chamber. By this means it is not necessary to interchange the chamber, since the capacity having been changed the result is the same for the purpose specified.

In a slight modification of this arrangement the compression chamber is divided into two or more compartments adapted to be placed in communication with one another by means of suitable valves so as to vary the effective capacity of the compression chamber. The same result may also be obtained by screwing the compression chamber to a greater or less extent on the cylinder as will be readily understood from the following.

The cylinders and pistons can operate in any suitable position on the frame of the car. They are if arranged horizontally, provided with a special device to transmit the vertical shock from the wheel to the horizontal piston.

The use of solid grease combined with thick valvoline or the like as obturator of the compressed air inside the cylinder in the movement of the piston, is also an essential feature of this invention.

The invention is illustrated in the accompanying drawings in which:

Figure 1 is a rear view, in elevation, of a road vehicle provided with pneumatic springs arranged in accordance with one form of the invention.

Fig. 2 is a view thereof in side elevation.

Fig. 3 is a view in rear elevation and on an enlarged scale of a modified arrangement of the cylinders and compression chamber in which the compression chamber is provided with means for subdividing it into separate compartments.

Fig. 4 is a view in side elevation illustrating the invention as applied to a railway vehicle.

Fig. 5 is a part sectional view showing the valve.

Referring now to the construction shown in Figs. 1 and 2, it will be seen that the axle M of the vehicle is provided with the usual laminated spring L, one end of which is attached to the chassis or frame of the vehicle, the other end being connected by means of a link D to a piston C adapted to reciprocate within a cylinder B. Similar arrangements are provided at each side of the vehicle as shown in Fig. 1, the two cylinders B being in open communication with a common compression chamber O, the cylinders B and the compression chamber O being supported on the chassis of the vehicle by brackets *i*. Each of the pistons C and cylinders B is of any suitable construction, provided with packing or sealing arrangements for preventing the escape of air from the compression chamber, and the device is adjusted in the following manner:

The vehicle being unloaded air under pressure is pumped into the cylinders B or into the chamber O through a suitable valve (not shown). The vehicle body being thus lifted by the compressed air until the pistons C are moved outwards from the cylinders B to the full extent of their stroke; the pumping is then discontinued and the pressure of air required to support the unloaded vehicle is noted. The vehicle is loaded with the total maximum weight or the number of passengers which the vehicle is to carry, and if this loading of the vehicle has caused the pistons C to move inwards throughout their full range of travel, the compression chamber O is removed and a compression chamber of another capacity substituted. The operations above described are then repeated until a compression chamber of such capacity has been selected that the pistons C occupy a suitable intermediate point in their range of travel, preferably the middle point thereof, when the vehicle is fully loaded.

It will be understood that should the above preliminary test result in the pistons C occupying a position towards their outward range of movement, a compression chamber of larger capacity is substituted for the compression chamber first installed.

The several cylinders B of the pneumatic springs employed may be arranged to communicate with a common compression chamber O, which with the cylinders B constitute a single metal container for the compressed air. Preferably a plug cock is provided for isolating the air inlet valve, this cock being closed when the compression chamber O has been filled with air to the desired pressure.

In certain cases it may be convenient to provide special arrangements for varying the capacity of the air compression chamber without removing the latter from the vehicle, and for this purpose the compression chamber may be divided into a number of different compartments which can be cut off from one another when desired by special valves or the like, thus reducing the effective capacity of the chamber. An arrangement of this kind is illustrated in Fig. 3, in which it will be seen that the compression chamber O comprises three separate compartments indicated at $u$, $t$, $u$ respectively, these compartments being separated by means of valves $e$ so that the capacity of the compression chamber O available for each of the cylinders B of the air springs may consist either of the total capacity of the compartments, $t$, $u$ or of the compartment $u$ only, as desired. As shown in Fig. 3, the valves $e$ are provided with sealing liquid indicated at $h$, this liquid being introduced through an inlet $j$. The air inlet is indicated at $m$, and certain constructional details of the air springs are indicated at the right hand side of the figure. It will be seen for instance that the cylinder B is surrounded externally by a tubular sleeve $a$, an extension $b$ which is screw-threaded on to a cover $r$, for the lower end of the piston C. Supporting lugs for securing the air spring to the chassis are indicated at $d$.

In a still further modification the compression chamber O may be arranged to have its capacity varied by screwing the compression chamber on to the cylinder B to a greater or less extent, so that the volume of air contained in the chamber O is reduced or increased.

Referring now to the construction shown in Fig. 4, the invention is illustrated as applied to a railway vehicle, the axle M which is supported in ball bearings $y$, carried in a block M' adapted to slide vertically in a bracket U, and this vertical movement being facilitated by means of ball bearings $q$. The piston C is secured to the vertical sliding block M', and springs or spring buffers indicated at $c$ are provided for absorbing lateral shocks on the vehicle. The compression chamber O is provided with an air inlet valve $m$ and an inlet $n$ through which lubricant or sealing fluid may be supplied to the piston C, and a pressure gauge V is provided for the compression chamber O.

It is of course understood that the position of the apparatus may be considerably varied by either placing it in a vertical or in a horizontal position.

Various other constructional arrangements of the air springs may obviously be adopted without exceeding the scope of the invention which is not limited to any particular disposition of the springs with reference to the vehicle frame, or to the springs of the vehicle in general, and the variations in these and other respects may obviously be made without exceeding the scope of the invention.

I claim as my invention:

1. A pneumatic spring comprising a cylinder secured to the frame of a vehicle; a piston for said cylinder, said piston being connected at its free end to the wheels of a vehicle; and a removable compression chamber associated with and in communication with said cylinder for varying the position of the piston in said cylinder when a chamber of different volume is used with the same load and same pressure.

2. A pneumatic spring comprising a cylinder; a piston associated with said cylinder, said cylinder containing a compressible fluid; and a removable compression chamber in communication with said cylinder for varying the position of the piston in said cylinder when a chamber of different volume is used with the same load and same pressure.

3. A pneumatic spring comprising a cylinder; a piston associated with said cylinder, said cylinder containing a compressible fluid; and a removable compression chamber in communication with said cylinder, said chamber comprising sections separated by valves for varying the position of the piston in said cylinder.

4. A pneumatic spring comprising a cylinder; a piston associated with said cylinder, said cylinder containing a compressible fluid, and a removable compression chamber in communication with said cylinder, said chamber comprising sections, and means for varying the position of the piston in said cylinder.

In testimony whereof he affixes his signature.

FRANCISCO DE URRUELA.

Witnesses:
  IGNACIO DE SORMENZEL,
  A. W. WAULA.